United States Patent [19]
Dresher et al.

[11] Patent Number: 5,657,707
[45] Date of Patent: Aug. 19, 1997

[54] SPRING-TINE RESIDUE WHEEL FOR PLANTERS

[75] Inventors: Michael J. Dresher, Canton; Stanley R. Clark, Hesston; Eric Johnson, Salina, all of Kans.

[73] Assignee: Great Plains Manufacturing, Incorporated, Assaria, Kans.

[21] Appl. No.: 503,382

[22] Filed: Jul. 17, 1995

[51] Int. Cl.⁶ ................................................. A01B 49/04
[52] U.S. Cl. ...................... 111/139; 172/606; 172/551; 172/556; 172/557; 172/540
[58] Field of Search .................... 111/139, 140, 111/141, 142, 143; 172/606, 540, 542, 551, 556, 557, 607, 608, 609, 610

[56] References Cited

U.S. PATENT DOCUMENTS

| | | |
|---|---|---|
| 720,098 | 2/1903 | Bamford . |
| 823,240 | 6/1906 | Waterman ........................... 172/556 |
| 1,244,982 | 10/1917 | Horst ................................. 172/556 |
| 1,680,031 | 8/1928 | White ............................... 111/139 X |
| 2,406,500 | 8/1946 | Karl ................................... 172/556 |
| 2,419,717 | 4/1947 | Karl ................................... 172/556 |
| 2,438,707 | 3/1948 | Kropp ................................ 172/556 |
| 2,551,313 | 5/1951 | Brinson . |
| 2,851,846 | 9/1958 | Van Der Lely et al. . |
| 2,909,888 | 10/1959 | Van Der Lely et al. ............. 172/556 |
| 2,953,891 | 9/1960 | Van Der Lely et al. ............. 172/556 |
| 3,010,526 | 11/1961 | Van Der Lely et al. . |
| 3,040,819 | 6/1962 | Morkoski et al. .................. 172/556 |
| 3,057,145 | 10/1962 | Van Der Lely . |
| 3,065,804 | 11/1962 | Morkoski ........................... 172/540 |
| 3,212,585 | 10/1965 | Bezzerides ......................... 172/142 |
| 3,217,813 | 11/1965 | Koemel . |
| 3,306,371 | 2/1967 | Bush .................................. 172/540 |
| 3,393,752 | 7/1968 | Hill et al. .......................... 172/527 |
| 3,401,753 | 9/1968 | Bezzerides et al. ................ 172/543 |
| 3,447,295 | 6/1969 | Van Der Lely . |
| 3,452,826 | 7/1969 | Lehman ............................. 172/551 |
| 3,601,201 | 8/1971 | Schmitz ............................. 172/269 |
| 3,770,064 | 11/1973 | Scarnato et al. ................. 111/139 X |
| 4,055,126 | 10/1977 | Brown et al. ....................... 111/85 |
| 4,114,697 | 9/1978 | Carlucci ............................ 172/543 |
| 4,282,934 | 8/1981 | Bezzerides ......................... 172/26 |
| 4,410,048 | 10/1983 | Tulen et al. ....................... 172/540 |
| 4,502,547 | 3/1985 | MacIntyre . |
| 4,782,654 | 11/1988 | Bezzerides ......................... 56/370 |
| 4,785,890 | 11/1988 | Martin ................................ 172/29 |
| 4,947,631 | 8/1990 | Kuehn . |
| 4,991,660 | 2/1991 | Horvath et al. ................. 172/540 X |
| 5,065,570 | 11/1991 | Kuehn . |
| 5,076,180 | 12/1991 | Schneider . |
| 5,129,282 | 7/1992 | Bassett et al. . |
| 5,255,617 | 10/1993 | Williams et al. . |
| 5,279,236 | 1/1994 | Truax . |
| 5,341,754 | 8/1994 | Winterton . |
| 5,349,911 | 9/1994 | Holst et al. . |
| 5,419,402 | 5/1995 | Heintzman ..................... 172/606 X |
| 5,443,023 | 8/1995 | Carroll ............................ 172/557 X |

FOREIGN PATENT DOCUMENTS 3435192  4/1986  Germany ............................... 111/139

*Primary Examiner*—Terry Lee Melius
*Assistant Examiner*—Victor Batson
*Attorney, Agent, or Firm*—Hovey, Williams, Timmons & Collins

[57] ABSTRACT

The residue wheel has a plurality of multiply bent spring-steel tines that project outwardly from their central hub at such angles that straight foot portions of the tines engage and lie flatly against the ground as the tines sweep residue rearwardly and outwardly during rotation of the wheel about an axis oblique to the path of travel of the planting machine. The tines are equally spaced about the wheel but are arranged in pairs, comprising individual legs of a generally U-shaped, integral unit having a bight at the inner ends of the the legs that joins the legs together and serves as a means by which the unit can be clamped between opposed, flat plates of the hub. Short downturned driving prongs at the outer ends of the legs provide traction for the wheel during use.

26 Claims, 3 Drawing Sheets

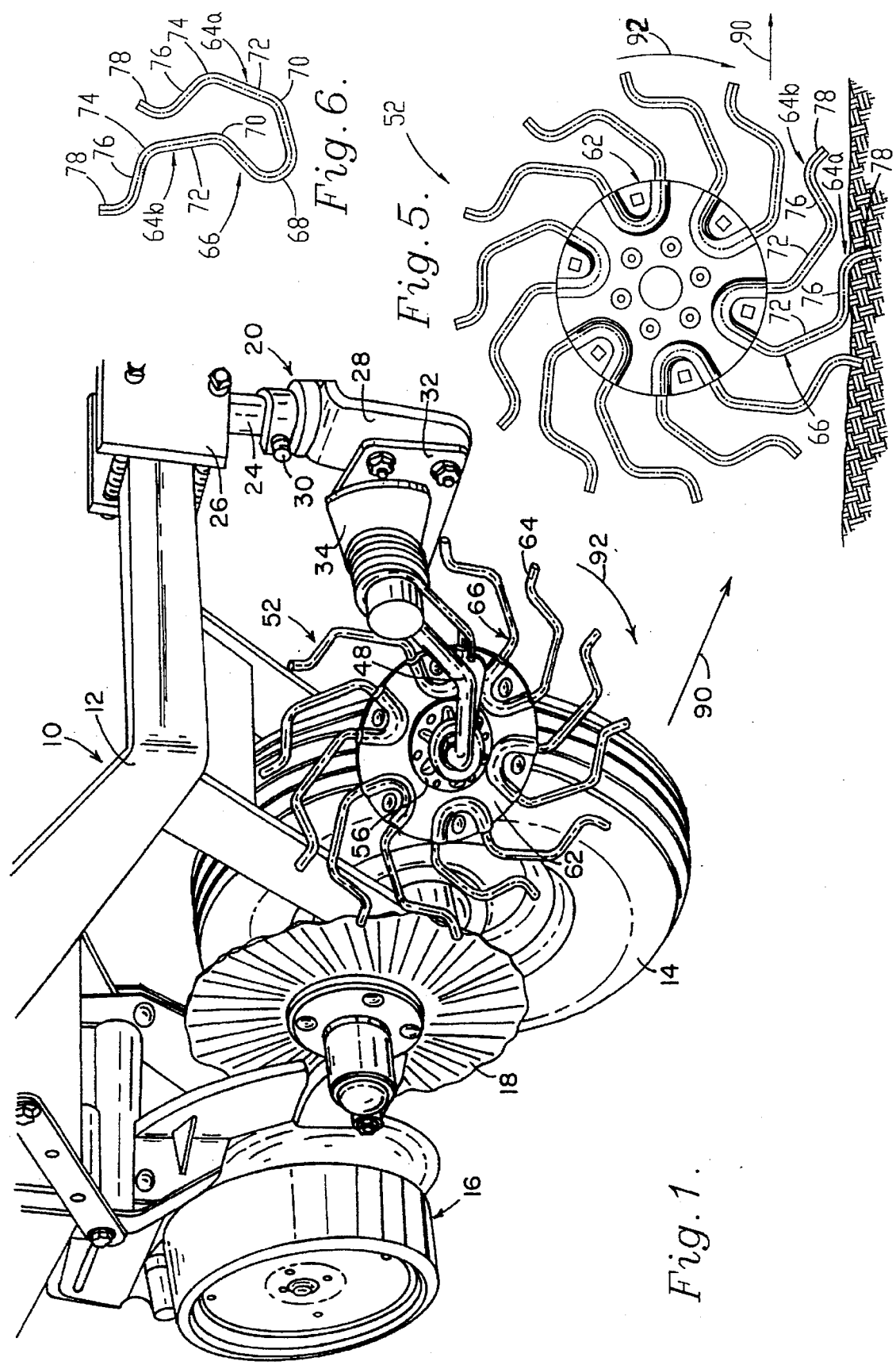

SPRING-TINE RESIDUE WHEEL FOR PLANTERS

TECHNICAL FIELD

This invention relates to the field of planting or drilling and, more particularly, to an attachment for such equipment for clearing away residue from in front of the planter to provide a relatively clean soil surface into which the planter can open a trench and deposit the seed.

BACKGROUND

Residue wheels have become increasingly popular in recent years as a means of removing a sufficient amount of crop residue from the soft surface to enable the planting or drilling unit to have a clean surface to work with. However, most conventional attachments require two of such wheels per crop row in order to perform effectively. Moreover, few of them make adequate provision for removing and replacing broken or damaged tines. In addition, many such attachments make no provision for maintaining a constant relationship between the tines and the soil. Specifically, even with floating mechanisms, many conventional tines have a tendency to gouge the soil and create a trench due to their design and shape.

SUMMARY OF THE INVENTION

Accordingly, one important object of the present invention is to provide an improved residue wheel which is so highly effective at sweeping crop residue from the seed planting zone that only a single one of such wheels is needed per row. In addition, an important object of the invention is the provision of tines which can be relatively easily removed and replaced in the event they become damaged or broken. Further objects include providing tines which are damage-resistant due to their yieldable nature yet are still highly effective in terms of their ability to move trash; providing a wheel that can be manufactured efficiently through the use of stamped and formed metal parts; providing a wheel which will instantly adjust to and accomodate changing terrain; providing a wheel that discourages wrapping of residue; and providing a wheel in which the special shape of the tine itself serves to control the depth of penetration of the tine into the soil.

In carrying out the foregoing and other important objects, the present invention contemplates a residue wheel having tines which are constructed from resilient spring steel so that the tines are resistant to breakage when hard foreign objects such as stones and roots are encountered. Each tine comprises one fine of a double tine unit having a generally U-shaped, integral body in which the two legs of the body comprise the two tines of the unit. A bight that joins the legs together at one end is clamped between a pair of superimposed plates forming the hub of the wheel so as to secure the tine unit to the hub, while the remaining portions of each tine project outwardly beyond the hub for engagement with the trash and the ground. The outer end of each tine is bent outwardly to project in a direction opposite to the direction of rotation of the wheel so that as the wheel rotates, the tines successively come into generally flat sweeping engagement with the ground. Downturned driving prongs are provided at the outer ends of the tines for assuring positive traction between the wheel and the ground.

BRIEF DESCRIPTION OF THE DRAWINGS

FIG. 1 is a fragmentary right, front perspective view of a planting machine incorporating a residue wheel attachment in accordance with the principles of the present invention;

FIG. 5 is an enlarged, side elevational view of the wheel; and

FIG. 6 is a plan view of one of the tine units of the wheel.

DETAILED DESCRIPTION

Figure 3:
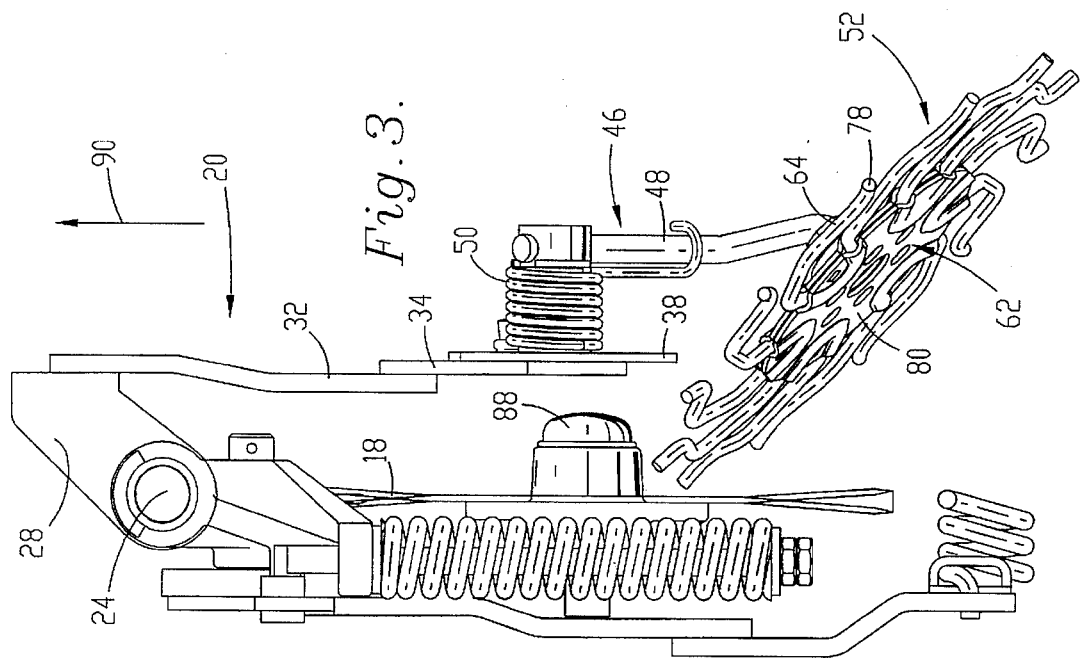
FIG. 3 is a top plan view of the residue wheel and associated coulter of FIG. 2.

The planting machine 10 in FIG. 1 has a frame 12 supported by one or more ground wheels 14. An opener 16 is carried by the frame 12 for making a seed trench or slot in the ground and depositing successive seeds into the trench at regular intervals as the machine is advanced. A fluted coulter 18 may be provided ahead of the opener to assist in forming the seed trench.

Figure 2:
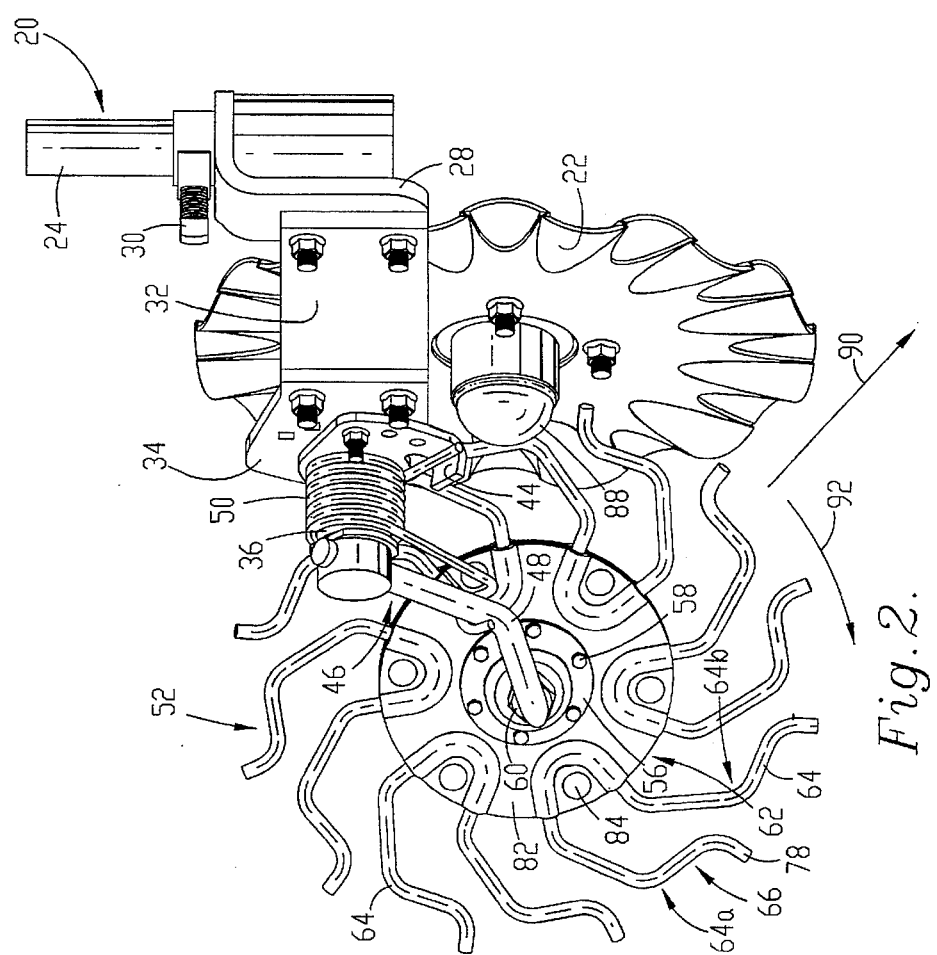
FIG. 2 is an enlarged right front isometric view of the residue wheel attachment itself and an associated coulter.

In accordance with the principles of the present invention, a residue wheel attachment 20 is secured to the frame 12 ahead of the opener 16 and the coulter 18 for clearing a path through crop residue and debris that would otherwise impede access of the opener 16 and coulter 18 to the ground surface. An additional coulter 22 (FIGS. 2 and 3) may be made a part of the residue wheel attachment 20, if desired, to facilitate the application and incorporation of starter fertilizer in a subsurface band at the time of planting.

The attachment 20 includes an upright swivel shaft 24 secured to the frame 12 by a mounting clamp 26. A downwardly extending bracket 28 is secured to the lower end of shaft 24 and can be pivoted around the shaft 24 into any one of a number of adjusted positions by loosening and then retightening a set screw 30. A generally rectangular extension plate 32 is bolted to the lower end of bracket 28 and projects rearwardly therefrom to support a mounting plate 34 that is provided with an outwardly projecting, tubular boss 36 which is only barely visible in FIGS. 2 and 3. A spring tension adjust plate 38 slips onto the boss 36 and butts up against the mounting plate 34 where it may be held in any one of several selectible rotative positions by a retaining bolt 40 inserted into an appropriate hole (not shown) in the mounting plate 34 and one of the three holes 42 (only two being visible) in the spring adjust plate 38. The spring adjust plate 38 has an outturned ear 44 which serves as a spring stop for the torsion spring of the assembly as will hereinafter be explained.

The attachment 20 further includes a support arm weldment 46 that includes a slightly crooked arm 48 having a transverse stub shaft (not shown) at its upper end that is rotatably received within the boss 36 so that arm 48 can swing up and down about the horizontal axis of the boss 36. The stub shaft is retained within the boss 36 by a suitable clip or other means well within the skill of those in the art. A torsion spring 50 encircles the boss 36 and bears against the ear 44 at one end while being hooked onto the arm 48 at the opposite end whereby to yieldably bias the arm 48 toward the ground. Interior stop means (not shown) associated with the boss 36 and the stub shaft of support arm weldment 46 cooperate to limit the extent of up and down swinging of the arm 48.

Figure 4:
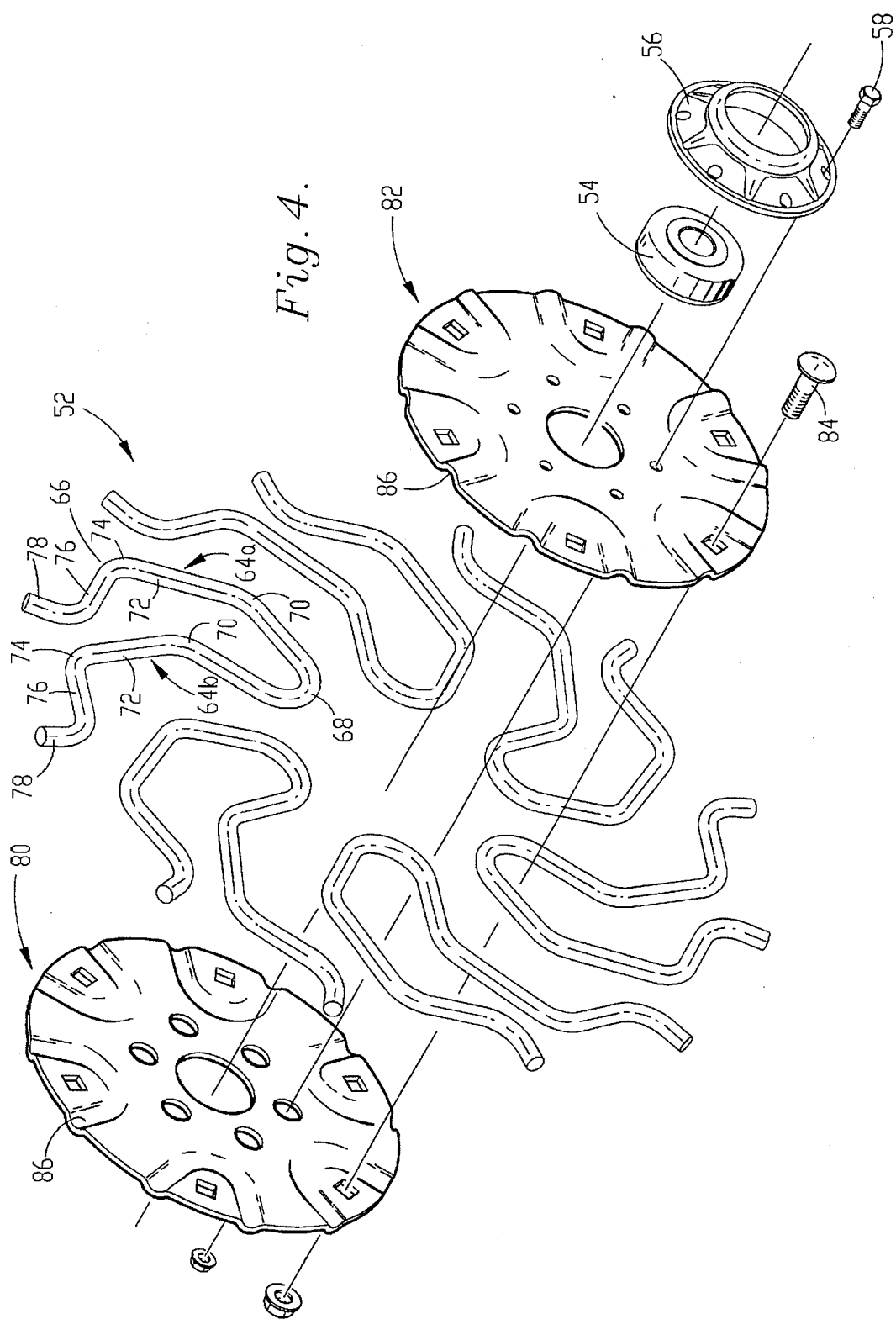
FIG. 4 is an exploded illustration the wheel.

The wheel attachment 20 further includes a wheel 52 rotatably secured to the outer end of the arm 48 for freewheeling rotation relative thereto. The wheel 52 has a bearing assembly 54 (FIG. 4) pressed into a flange plate 56 that is in turn secured to the wheel 52 by bolts 58. A bolt (not shown) enters the bearing assembly 54 from the back side of the wheel 52 and is threaded into a nut 60 fixed to the lower end of the arm 48 to secure the wheel 52 to arm 48.

The wheel 52 has as its primary components a circular hub 62 and a plurality of spring tines 64 projecting from the hub 62 around its outer periphery. The tines 64 are equally spaced around the hub 62 but preferably comprise individual legs of a series of generally U-shaped, double tine units 66 that are fastened to the hub 62 at their point of interconnection with one another. All of the tines 64 lie within the same flat plane as the hub 62.

As illustrated in FIG. 6 each of the double tine units 66 has a generally U-shaped overall configuration and is preferably constructed from spring steel rod of circular cross-sectional configuration that has been cut to length and formed into the desired shape. The two tines 64 of each unit 66 comprise two laterally spaced apart legs 64a and 64b that are integrally joined together at their inner ends by a bight 68. The bight 68 also serves as the mounting portion of each unit 66 as will be seen.

The two legs 64a and 64b diverge from one another in a symmetrical manner as the bight 68 is departed. At approximately one-third of the way out, the two legs each turn forwardly at a bend 70 and continue conjointly outwardly in slanted, but straight, shank portions 72. The shank portions 72 are angled forwardly from their respective bight arms 68 at the same angle, i.e., approximately 135 degrees, but do not extend in parallelism with one another because of the diverging nature of the bight arms. At approximately two-thirds of the way out, the two legs each have another bend 74 and turn further forwardly in straight, sweeping foot portions 76 that extend at approximately 135 degree angles to their respective shank portions 72. At the outermost ends of the foot portions 76 the legs 64a and 64b are provided with short downturned driving prongs 78 that are disposed to project substantially radially from the central axis of the wheel when the tine unit is installed. All portions of the tine unit 66 lie in the same plane.

The hub 62 is comprised of a pair of circular, stamped metal plates 80 and 82 of virtually identical construction that are inverted relative to one another and are held together in superimposed relationship by a series of carriage bolts 84. Each of the plates 80,82 is substantially flat except for a series of arcuate depressions 86 about their peripheries that are configured to complementally receive the bights 68 of the tine units 66 when they are installed on the hub 62. There is one bolt 84 for each tine unit 66, with the bolt being centered below the arch of the bight when the tine unit is installed, thus assuring a tight clamping action of the plates 80,82 against one another and the bights 68 in the area of the depressions 86.

All of the tine units 66 are installed in the same orientation with the leg 64a leading the leg 64b with respect to the intended direction of rotation of the wheel. Thus, as illustrated in FIG. 5, the tine leg 64a engages the ground first, as between the two legs 64a and 64b. Furthermore, the foot portions 76 are disposed to lie flatly against the ground and project opposite to the direction of rotation of the wheel as they successively move into engagement with the ground. While the prongs 78 penetrate the soil slightly to obtain traction for the wheel, they are limited in their depth of penetration by the foot portions 76 against the top surface of the soil.

It will be seen that the support arm 48 extends generally downwardly and outwardly such that the wheel 52 rotates about an axis that is oblique with respect to the path of travel of the opener 16. Preferably, the wheel 52 is tipped slightly forwardly at its upper end as shown in the plan view of FIG. 3 such that the axis of rotation of the wheel 52 extends forwardly, outwardly and slightly downwardly. Preferably, the wheel 52 is usually pulled rather than pushed by the support arm 48, although with certain minor mounting modifications the wheel 52 can be mounted ahead of the hub 88 of the fertilizer coulter 18 rather than behind the hub as in the illustrated embodiment. Furthermore, the wheel 52 can be set up for either left or right-hand throw.

As the machine 10 moves forwardly in the direction of the arrow 90 in FIGS. 1,2,3 and 5, the wheel 52 is disposed in forward alignment with the opener 16. Consequently, as the tines 64 of the obliquely angled wheel 52 engage the ground and the residue lying thereon, the forward motion of the machine 10 causes the free-wheeling wheel to be rotatively driven by the ground in a clockwise direction viewing FIGS. 1, 2 and 5 as illustrated by the arrow 92 in those figures. Consequently, debris and residue are swept cleanly from the ground surface by the tines 64, particularly foot portions 76, as the tines move downwardly, rearwardly and outwardly and then upwardly, rearwardly and outwardly through the trash. The foot portions 76 are especially helpful as they come down flatly against the residue and then sweep it to one side as they move generally horizontally outwardly and rearwardly through the critical zone.

In the event stones or other hard foreign objects are encountered by the tines 64, they simply flex yieldably to the extent necessary to avoid breakage. However, if for any reason a tine does become damaged or broken, it may be easily removed and replaced by loosening the bolts 84 to separate the plates 80, 82. If uneven terrain is encountered, the torsion spring 50 permits the arm 48 to swing up independently of the opener 16 to the extent necessary to accomodate the terrain change.

Although preferred forms of the invention have been described above, it is to be recognized that such disclosure is by way of illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and assess the reasonably fair scope of their invention as pertains to any apparatus not materially departing from but outside the literal scope of the invention as set out in the following claims.

We claim:

1. In a seed planting machine having a ground-driven residue wheel for clearing residue from the intended path of travel of an opener of the machine, the improvement in said residue wheel comprising:

a hub rotatable about an axis extending obliquely of said path of travel; and a plurality of elongated spring tines projecting from the hub in disposition for engaging and raking residue from said path of travel as the machine is advanced, each of said tines including as an integral part thereof an outer elongated foot portion projecting generally opposite to the direction of rotation of the wheel and disposed to lie generally flatly against the top surface of the ground as the tines are successively brought into engagement with the ground during forward movement of the machine for sweeping the residue to one side of the path of travel, each of said foot portions having a downturned driving prong at an outer end thereof so that the prong projects down into the ground when the foot portion of its tine is disposed generally flatly against the top surface of the ground, said foot portions serving to limit the depth of penetration of the driving prongs and to resist the accumulation of residue on the wheel.

2. In a planting machine as claimed in claim 1, each of said tines having all portions thereof disposed in a same plane.

3. In a planting machine as claimed in claim 1, each of said tines further having an inner shank portion integrally joined to an inner end of said foot portion for spacing the foot portion outwardly away from the hub.

4. In a planting machine as claimed in claim 3, each of said tines additionally having a mounting portion integrally joined to an inner end of said shank portion for securing the tine to the hub.

5. In a plating machine as claimed in claim 1, said tines being connected together in pairs, with the tines of each pair comprising individual legs of a single, generally U-shaped unit having a bight that interconnects the two legs at an inner end of the legs.

6. In a planting machine as claimed in claim 5, each tine unit having an inner mounting portion adjacent the bight wherein the legs of the unit diverge oppositely from one another as the bight is departed, an intermediate shank portion wherein the legs both slant outwardly in a direction generally opposite to the direction of rotation of the wheel, and an outer sweeping portion presented by the foot portions of the tines.

7. In a planting machine as claimed in claim 6, each of said tines having all portions thereof disposed in a same plane.

8. In a planting machine as claimed in claim 5, said hub comprising a pair of generally flat, superimposed plates having the bights of the tine units sandwiched therebetween, and releasable fasteners removably retaining said plates in said superimposed relationship to permit removal and replacement of the tine units.

9. In a planting machine as claimed in claim 8, said plates having depressions configured to matingly receive opposite faces of the bights of the tine units.

10. In a planting machine as claimed in claim 9, there being one fastener for each tine unit with the fastener extending between the legs of each unit in the area of said bight.

11. In a planting machine as claimed in claim 1; and mechanism coupled with said hub for yieldably biasing the hub toward the ground.

12. A residue wheel for use in clearing residue from an intended path of travel of a seed planting machine comprising:

a hub adapted for rotation about an axis extending obliquely of said path of travel; and a plurality of elongated spring tines projecting from the hub in disposition for engaging and raking residue from said path of travel as the machine is advanced, each of said tines including as an integral part thereof an outer elongated foot portion projecting generally opposite to the direction of rotation of the wheel and disposed to lie generally flatly against the top surface of the ground as the tines are successively brought into engagement with the ground during forward movement of the machine for sweeping the residue to one side of the path of travel, each of said foot portions having a downturned driving prong at an outer end thereof so that the prong projects down into the ground when the foot portion of its tine is disposed generally flatly against the top surface of the ground, said foot portions serving to limit the depth of penetration of the driving prongs and to resist the accumulation of residue on the wheel.

13. A residue wheel as claimed in claim 12, each of said tines having all portions thereof disposed in a same plane.

14. A residue wheel as claimed in claim 12, each of said tines further having an inner shank portion integrally joined to an inner end of said foot portion for spacing the foot portion outwardly away from the hub.

15. A residue wheel as claimed in claim 14, each of said tines additionally having a mounting portion integrally joined to an inner end of said shank portion for securing the tine to the hub.

16. A residue wheel as claimed in claim 12, said tines being connected together in pairs, with the tines of each pair comprising individual legs of a single, generally U-shaped unit having a bight that interconnects the two legs at an inner end of the legs.

17. A residue wheel as claimed in claim 16, each tine unit having an inner mounting portion adjacent the bight wherein the legs of the unit diverge oppositely from one another as the bight is departed, an intermediate shank portion wherein the legs both slant outwardly in a direction generally opposite to the direction of rotation of the wheel, and an outer sweeping portion presented by the foot portions of the tines.

18. A residue wheel as claimed in claim 17, each of said tines having all portions thereof disposed in a same plane.

19. A residue wheel as claimed in claim 16, said hub comprising a pair of generally flat, superimposed plates having the bights of the tine units sandwiched therebetween, and releasable fasteners removably retaining said plates in said superimposed relationship to permit removal and replacement of the tine units.

20. A residue wheel as claimed in claim 19, said plates having depressions configured to matingly receive opposite faces of the bights of the tine units.

21. A residue wheel as claimed in claim 20, there being one fastener for each tine unit with the fastener extending between the legs of each unit in the area of said bight.

22. A replaceable tine unit for a residue wheel comprising a generally U-shaped, unitary body having a pair of elongated, resilient, laterally spaced apart legs integrally interconnected at one end by a bight, one of said legs comprising a leading leg with respect to the intended direction of rotation of the wheel when the tine unit is installed thereon and the wheel is placed in use and the other of said legs comprising a trailing leg with respect to said intended direction of rotation, each of said legs having an outer sweeping foot portion inturned generally toward said bight and disposed at least generally within the plane of the bight and projecting generally in a direction opposite to said intended direction of rotation, each of said legs having a driving prong outturned generally away from the bight and located at an outer end of the foot portion.

23. A replaceable tine unit as claimed in claim 22, said body having all portions thereof disposed in the same plane.

24. A replaceable tine unit as claimed in claim 22, each of said legs further having an intermediate shank portion connecting the foot portion with the bight.

25. A replaceable tine unit as claimed in claim 24, said legs diverging symmetrically outwardly from one another at said bight and slanting conjointly outwardly from the bight in a direction opposite to said direction of rotation at said intermediate shank portion.

26. A replaceable tine unit as claimed in claim 22, said tine unit being constructed from formed metal rod of circular cross-sectional configuration.

* * * * *